United States Patent
Awaji et al.

(10) Patent No.: US 6,786,393 B2
(45) Date of Patent: Sep. 7, 2004

(54) PINHOLE DISK LAMINATE AND A PROCESS FOR PRODUCING THE SAME

(75) Inventors: Mitsuhiro Awaji, Sayo-gun (JP); Nagao Kamijo, Sayo-gun (JP); Shigeharu Tamura, Ikeda (JP); Masato Yasumoto, Tsukuba (JP)

(73) Assignees: Japan Synchrotron Radiation Research Institute, Hyogo (JP); National Institue of Advanced Industrial Science, Chiyoda-ku (JP)

( * ) Notice: Subject to any disclaimer, the term of this patent is extended or adjusted under 35 U.S.C. 154(b) by 169 days.

(21) Appl. No.: 10/050,775

(22) Filed: Jan. 18, 2002

(65) Prior Publication Data

US 2002/0104871 A1 Aug. 8, 2002

(30) Foreign Application Priority Data

Feb. 5, 2001 (JP) ........................................ 2001-028491

(51) Int. Cl.[7] ............................ B23K 31/02; G21K 1/02
(52) U.S. Cl. ........................ 228/190; 378/147; 378/149; 356/152.1
(58) Field of Search ................................ 228/173.6, 174, 228/190; 156/152, 239; 356/152.1; 29/603.06; 378/147, 149

(56) References Cited

U.S. PATENT DOCUMENTS

| 4,910,759 A | * | 3/1990 | Sharnoff ..................... 378/147 |
| 5,946,100 A | * | 8/1999 | Ishihara ..................... 356/608 |
| 6,211,951 B1 | * | 4/2001 | Guch, Jr. .................. 356/152.1 |
| 6,449,366 B1 | * | 9/2002 | Gotoh et al. ................ 380/203 |

FOREIGN PATENT DOCUMENTS

| JP | 07-230537 A | * | 8/1995 |
| JP | 63-049424 A | * | 3/1998 |
| JP | 11-317552 A | * | 11/1999 |
| JP | 2001-047517 A | * | 2/2001 |
| JP | 2001-357568 A | * | 12/2001 |

* cited by examiner

Primary Examiner—L. Edmonson
(74) Attorney, Agent, or Firm—Banner & Witcoff, Ltd.

(57) ABSTRACT

A plurality of pinhole disks are superposed, fixed in position with the pinholes brought into alignment with the aid of a wire, a pin or light, and bonded or welded together to form a pinhole disk laminate. The laminate has an untapered deep enough center through-hole and is suitable as an order sorting aperture (OSA) in hard x-ray microscopy using a FZP.

10 Claims, 2 Drawing Sheets

PINHOLE DISK LAMINATE AND A PROCESS FOR PRODUCING THE SAME

BACKGROUND OF THE INVENTION

This invention relates to a pinhole disk laminate for use as an order sorting aperture (OSA) in hard x-ray microscopy using a Fresnel zone plate (FZP). The invention also relates to a process for fabricating the pinhole disk laminate.

According to the invention, the pinhole disk laminate is used as an OSA in highly energetic x-ray microscopy and this enables viewing of very fine structures that have defied observation by conventional x-ray microscopy (roentgenography) on account of its limited spatial resolution.

A potential application of the invention is in the medical field where it is expected to perform satisfactorily enough to take the place of conventional roentgenography. The invention also finds applicability to materials science, where the strong penetrating power of high-energy x-rays which characterizes hard x-ray microscopy is utilized to perform nondestructive inspection and analysis of heavy metals and thick metallic materials as exemplified by nondestructive inspection of nuclear fuel rods, etc.

When applied to biology, high-energy x-rays present so small damage to biosamples that the activities and internal structures of animal and plant can be observed on the site in a viable condition.

The OSA (hereunder referred to as a pinhole disk) is an essential optical element for the development of x-ray microscopes using a Fresnel zone plate (FZP). The existing x-ray microscopes using a FZP have performed satisfactorily well with the conventional thickness of pinhole disks and this is primarily because they use x-rays of low energy. For example, a single metal disk 9.5 mm in diameter have proved satisfactory if it has a round through-hole in the center with a diameter of 20 $\mu$m.

However, if the energy of the x-rays used is increased to near 100 keV, even a platinum pinhole disk is insufficient to stop (block) the unwanted hard x-rays diffracted from the FZP in hard x-ray microscopy as long as it has the insufficient thickness.

As shown in FIG. 1, the pinhole disk which is used as a component of a hard x-ray microscope receives hard x-rays coming from the left and the incident light is divided into two parts, one being condensed by a FZP and indicated by 1 in FIG. 1 and the other indicated by 2. The pinhole disk selectively transmits the condensed light 1 of a specified order but blocks the unwanted light 2.

One may think that the above-described problem of failure to stop the unwanted hard x-rays could be solved by increasing the thickness of the pinhole disk. However, making a 20 $\mu$m untapered through-hole in a single thick metal disk involves considerable technical limitations and pinhole disks fabricated by the conventional pinhole making technology has been unsuitable for the development of hard x-ray microscopes using the FZP.

SUMMARY OF THE INVENTION

The present invention is characterized by bonding or welding a multiple of pinhole disks with the openings of their pinholes kept in alignment. To this end, a wire (e.g. a tungsten wire), a fiber or a pin is passed through the pinholes in the superposed disks which are then bonded (or welded) together with their pinholes kept in alignment. Alternatively, light such as laser light may be guided through the pinholes in the superposed disks which are then secured with their pinholes kept in alignment.

By using the method of the invention, one can fabricate a pinhole disk laminate that has an untapered deep enough hole to stop (block) unwanted hard x-rays. The thickness of the laminate can be adjusted by choosing the number of pinhole disks to be superposed.

DETAILED DESCRIPTION OF THE INVENTION

Figure 1:
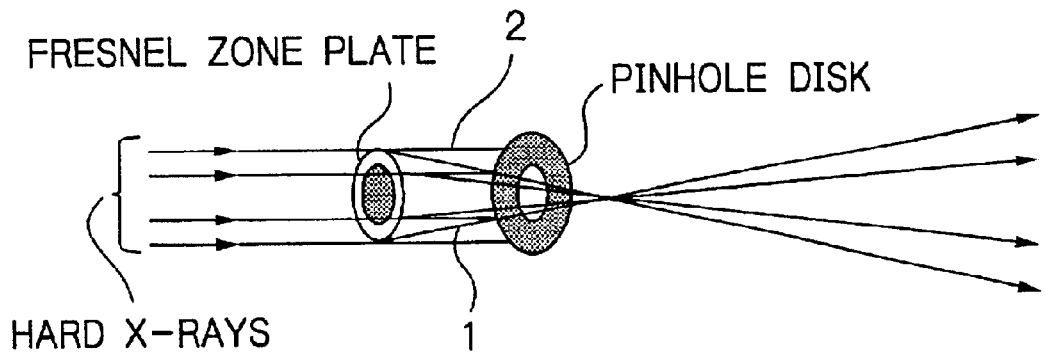
FIG. 1 illustrates the function of a pinhole disk in a hard x-ray microscope using a FZP.
Figure 2:
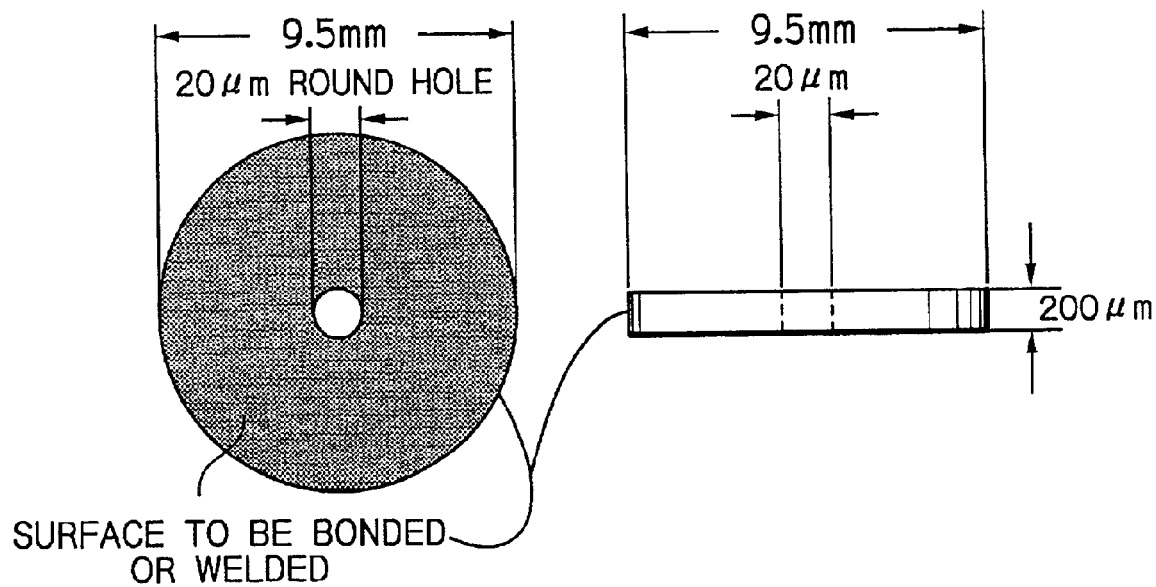
FIG. 2 shows a single pinhole disk both in a plan view (a) and in section (b)

FIGS. 2(a) and 2(b) show an example of the specifications of a single pinhole disk. The disk is made of platinum and has an outside diameter of 9.5 mm with a thickness of 200 $\mu$m. It has a round through-hole in the center which is 20 $\mu$m in diameter and 200 $\mu$m deep. This hole can be made by conventional electrical discharge machining technology, etc.

Figure 3:
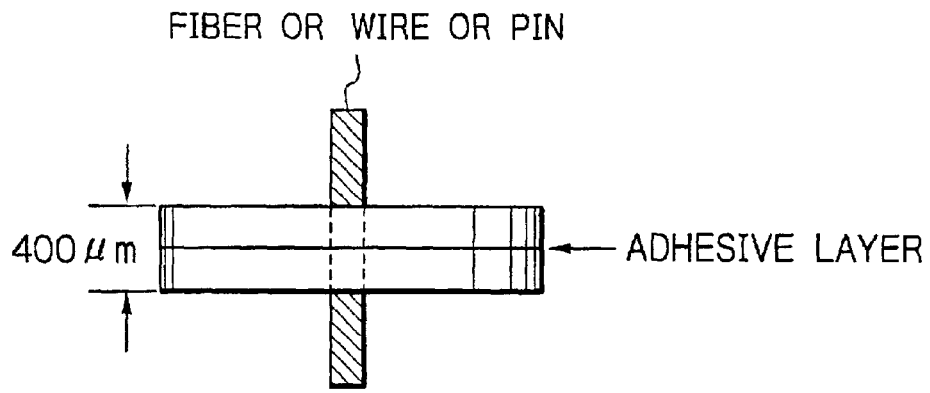
FIG. 3 shows the step of bonding or welding two superposed pinhole disks with a wire or a fiber or a pin inserted through the pinholes to keep their positions in alignment.

In the next step, a plurality of such pinhole disks are superposed and bonded or welded together. FIG. 3 shows an exemplary case in which two pinhole disks are superposed. The position in which these two pinhole disks are to be fixed is determined by inserting a straight wire, fiber, pin, etc. through the pinholes so that their positions will not be offset. A microscope is used to view the pinholes containing the wire, fiber, or pin to bring the positions of the pinholes into alignment.

Figure 4:
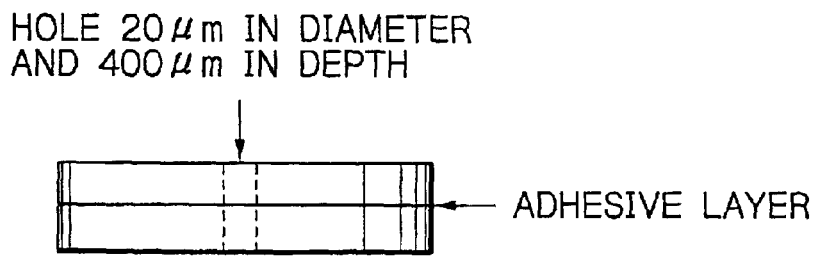
FIG. 4 shows a pinhole disk laminate in a completed form.

Subsequently, the surfaces of the pinhole disks (excluding the holes) are bonded or welded together. After the end of bonding or welding, the wire, fiber, pin, etc. is removed to leave a pinhole disk laminate behind in a completed form (FIG. 4).

Figure 5:
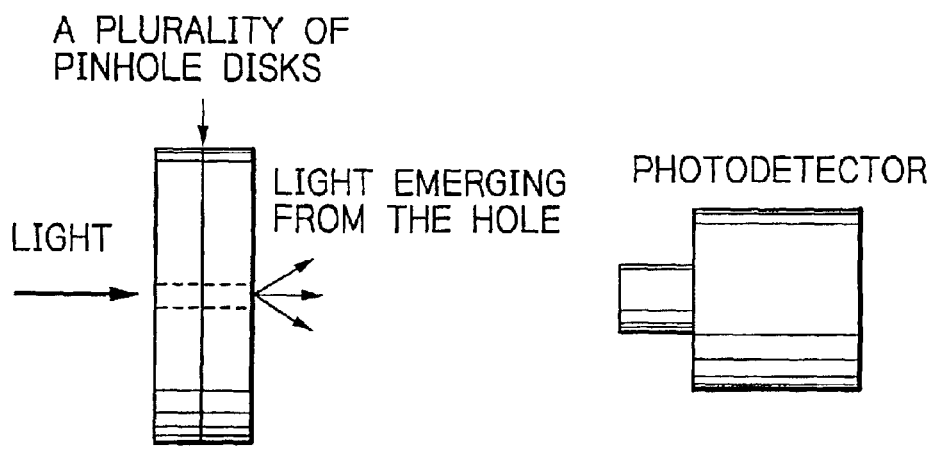
FIG. 5 shows the step of adjusting and determining the relative positions of holes in a plurality of pinhole disks with the aid of light such as laser light.

If light such as laser light is used as a means of aligning the holes in a plurality of pinhole disks, the method shown in FIG. 5 is used; in this method, the intensity of the light passing through the holes is measured with a photodetector and the relative positions of the pinholes in the disks are so adjusted and determined as to provide a maximum intensity.

According to the calculation made by the present inventors, the pinhole disk laminate of the invention can block 99.9% of 82-keV hard x-rays if it consists of two platinum pinhole disks superposed to give a thickness of 400 $\mu$m. This is sufficient data to prove the practical feasibility of the pinhole disk laminate as an OSA in hard x-ray microscopy using a FZP.

The hard x-ray microscope using a FZP is expected to achieve the highest spatial resolution of all the hard x-ray microscopes proposed to date and it can be realized by the invention of the pinhole disk laminate.

What is claimed is:

1. A process for producing an untapered pinhole disk laminate for use as an order sorting aperture in hard-x-ray microscopy using a Fresnel zone plate which comprises the steps of superposing a plurality of pinhole disks, passing a wire, a fiber, or a pin through the pinholes and viewing the pinholes containing the wire, fiber, or pin with a microscope and adjusting the relative positions of the respective pinholes of the disks to bring the pinholes into alignment, and bonding or welding the superposed pinhole disks together with the positions of their pinholes kept in alignment.

2. A process for producing an untapered pinhole disk laminate for use as an order sorting aperture in hard x-ray microscopy with a Fresnel zone plate which comprises the steps of superposing a plurality of pinhole disks, passing light through the pinholes and measuring the intensity of light passing through the pinholes with a photodetector, adjusting the relative positions of the pinholes in the disks to provide a maximum light intensity and to align the pinholes, and bonding or welding the superposed pinhole disks together with the positions of their pinholes kept in alignment.

3. The method of claim 1 wherein the pinhole disks are made of metal.

4. The method of claim 3 wherein the metal is platinum.

5. The method of claim 2 wherein the pinhole disks are made of metal.

6. The method of claim 5 wherein the metal is platinum.

7. An untapered pinhole disk for use as an order sorting aperture in hard x-ray microscopy using a Fresnel zone plate comprising a multiple of superposed metal pinhole disks which are bonded or welded together with the positions of the respective center pinholes kept in alignment, thereby forming an untapered hole through the center of the pinhole disk laminate.

8. The laminate of claim 7 wherein the metal is platinum.

9. The laminate of claim 7, the thickness of which is adjustable by changing the number of the superposed metal pinhole disks.

10. The laminate of claim 9 wherein the metal is platinum.

* * * * *

UNITED STATES PATENT AND TRADEMARK OFFICE
CERTIFICATE OF CORRECTION

| | | |
|---|---|---|
| PATENT NO. | : 6,786,393 B2 | Page 1 of 1 |
| APPLICATION NO. | : 10/050775 | |
| DATED | : September 7, 2004 | |
| INVENTOR(S) | : Mitsuhiro Awaji et al. | |

It is certified that error appears in the above-identified patent and that said Letters Patent is hereby corrected as shown below:

On the cover, column 1, (73) Assignee: "National Institute of Advanced Industrial Science" should be replaced with --National Institute of Advanced Industrial Science and Technology--.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,786,393 B2 | Page 1 of 1 |
| APPLICATION NO. | : 10/050775 | |
| DATED | : September 7, 2004 | |
| INVENTOR(S) | : Mitsuhiro Awaji et al. | |

It is certified that error appears in the above-identified patent and that said Letters Patent is hereby corrected as shown below:

On The Title Page; (73) Assignee: "National Institue of Advanced Industrial Science" should be replaced with --National Institute of Advanced Industrial Science and Technology--.

Signed and Sealed this

Third Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,786,393 B2
APPLICATION NO. : 10/050775
DATED : September 7, 2004
INVENTOR(S) : Mitsuhiro Awaji et al.

It is certified that error appears in the above-identified patent and that said Letters Patent is hereby corrected as shown below:

On The Title Page; (73) Assignee: "National Institue of Advanced Industrial Science" should be replaced with --National Institute of Advanced Industrial Science and Technology--.

This certificate supersedes Certificate of Correction issued October 3, 2006.

Signed and Sealed this

Seventh Day of November, 2006

JON W. DUDAS
*Director of the United States Patent and Trademark Office*